United States Patent Office 2,851,450
Patented Sept. 9, 1958

2,851,450

PROCESS FOR PRODUCTION OF SOLID POLYMERIC COMPOUNDS

James E. Pritchard, Bartlesville, Okla., assignor to Phillips Petroleum Company, a corporation of Delaware No Drawing. Application August 21, 1953
Serial No. 375,811

19 Claims. (Cl. 260—88.3)

This invention relates to solid polymeric compounds. In one of its aspects, this invention relates to the production of solid polymers from liquid copolymers of a copolymerizable monomer with a heterocyclic nitrogen base of the pyridine and quinoline series. In another of its aspects this invention relates to an improved process for the production of solid polymeric compounds from polymers of vinyl heterocyclic nitrogen bases of the pyridine and quinoline series by first dispersing the polymer in a liquid, non-compatible quaternizing agent to form a free-flowing mixture and then heating the mixture to render the material compatible and to effect quaternization thereby resulting in the formation of a solid polymeric product.

This is a continuation-in-part of my co-pending application, Serial No. 284,448, filed April 25, 1952, now abandoned.

I have now discovered a new and improved process for the production of solid polymeric compounds from polymers of vinyl heterocyclic nitrogen bases of the pyridine and quinoline series. This process comprises dispersing the polymer in a liquid, non-compatible quaternizing agent to form a free-flowing mixture and then heating the mixture to render the materials compatible and thereby effecting quaternization. As a result of the quaternization reaction, a solid polymeric product is obtained. The dispersion or slurry of vinyl heterocyclic nitrogen base polymers in non-compatible quaternizing agents can be used in dipping, casting, and coating operations.

The process of this invention is to be distinguished from a process in which a compatible liquid quaternizing agent is employed. Quaternizing agents are defined herein as non-compatible, as described more fully hereinafter, when a rubbery or resinous polymer does not swell more than 20 percent during the processing or dispersion period or a liquid polymer is not solvated more than 20 percent. When a finely divided solid vinvyl heterocyclic nitrogen base polymer is mixed with a compatible liquid quaternizing agent in an amount which would give the necessary solids content applicable for dipping and coating operations, the polymer swells and the mixture usually becomes thick and gel-like and resembles a stiff paste. When a liquid vinyl heterocyclic nitrogen base polymer is mixed with a compatible liquid quaternizing agent, the polymer dissolves.

On the other hand, when these polymers of vinyl heterocyclic nitrogen bases are dispersed in the non-compatible quaternizing agents, the dispersion remains in a fluid state and is readily adaptable to casting and dipping operations. For example, the liquid may be poured into molds where the quaternization is made to take place as described below. In a dipping operation, the object to be coated is dipped into the liquid, is withdrawn, and then heated to effect quaternization, or the object may be preheated and dipped whereby the quaternization is effected at the surface of the object while in the liquid. The coating may be permanent, or forms may be used in which case the solid rubbery polymeric material would be peeled off of the forms in much the same manner as one would take off a pair of gloves.

When operating according to the method of this invention, a polymer of a vinyl substituted heterocyclic nitrogen base is contacted with a non-compatible liquid quaternizing agent of the type hereinafter described and at a temperature generally in the range between 0 and 50° C. However, a temperature higher than 50° C. can be employed whenever the quaternizing agent does not swell a rubbery or resinous polymer more than 20 percent by volume or does not cause more than 20 percent solvation of a liquid polymer at the temperature used during the processing steps which includes the time required to produce a dispersion of the polymer in the quaternizing agent and such other steps as are required prior to heating. The contacting or mixing of the quaternizing agent with the polymer can be effected by any desirable means found in the art, e. g., paint mill, blender, homogenizer, colloid mill and the like, or it may be merely stirred in. It is sometimes advantageous to use dispersing agents, or plasticizers in the mix. The use of such agents is well known in the art. After the materials have been thoroughly mixed and such other ingredients added as desired, the composition can then be used, for example, in dipping or casting operations. After casting or dipping the temperature is then raised to a level where quaternization is effected. As the temperature is increased to the level where reaction occurs, compatibility of the quaternizing agent for the polymer increases and the mixture becomes viscous and finally sets to a hard homogeneous mass. The heating step is generally effected at a temperature in the range between 50 and 250° C. for a time in the range between 5 minutes and 72 hours. The temperature is governed largely by the particular quaternizing agent employed. The time required to effect quaternization is dependent for the most part upon the temperature and, in general, varies from 10 minutes to 25 hours.

When a polymer is dispersed in a non-compatible quaternizing agent, the dispersion resulting therefrom is a heterogeneous blend in which reaction does not occur to any appreciable extent. When said blend is heated to a sufficient degree, the blended materials become compatible, that is, the polymer forms a homogeneous blend with the quaternizing agent in which reaction is free to take place. This is contrasted with compatible quaternizing agents where the materials become homogeneous upon mixing.

The polymeric materials which are applicable in this invention are homopolymers of vinyl heterocyclic nitrogen bases of the pyridine and quinoline series and copolymers of these compounds with copolymerizable materials such as conjugated dienes, styrene, alkyl and halogen substituted styrenes, vinyl chloride, vinyl acetate, vinylidene chloride, acrylonitrile, methacrylonitrile, methyl acrylate, methyl methacrylate, and the like. These polymers can be prepared by any suitable method, for example, emulsion polymerization. While it is generally preferred to employ polymers which range from soft rubbers to hard resinous materials, liquid polymers are also applicable to the process of my invention. These liquid polymers can vary from very fluid to very viscous materials and can have a viscosity measurement in SUS (Saybolt Universal seconds) at 100° F. from below 1000 and up to 10,000 or higher, such as 400,000. If rubbers, these polymers may range from soft to hard rubbers having a Mooney value up to 100 or even higher. Homopolymers of vinyl heterocyclic nitrogen bases are resinous in nature as are certain of their copolymers.

The heterocyclic nitrogen bases, including the alkyl substituted bases, which are employed in my invention are those which contain at least one

group in which R is hydrogen or methyl, i. e., the substituent is either a vinyl or an alpha-methylvinyl (isopropenyl) group. The vinyl-substituted heterocyclic nitrogen bases of the pyridine and quinoline series having only one vinyl substituent as well as their various alkyl substituted derivatives are preferred. The total number of carbon atoms in the nuclear substituted alkyl groups attached to any pyridine or quinoline derivative preferably should not be greater than 12. In addition to vinyl substituted pyridines and quinolines, the isopropenyl substituted pyridines and quinolines are useful.

Pyridine and quinoline base compounds which are applicable in my invention are such as 2-vinylpyridine, 5-methyl-2-vinylpyridine, 5-ethyl-2-vinylpyridine, 2-methyl-5-vinylpyridine, 2,5-divinylpyridine, 3-methyl-2,5-divinylpyridine, 4-methyl-3-vinylpyridine, 2-isopropenylpyridine, 5-propyl-2-isopropenylpyridine, 2-octyl-5-vinylpyridine, 2-vinylquinoline, 8-ethyl-2-vinylquinoline, 4-hexyl-5-vinylquinoline, 1-vinylisoquinoline, 5-methyl-1-isopropenylisoquinoline, 1,8-divinylisoquinoline, 2,5-divinylquinoline, 6,7-dimethyl-2,5-divinylquinoline and the like compounds.

For the production of the polymers, the vinyl heterocyclic nitrogen base component is generally in the range between 2 and 100 parts by weight of the total monomeric material employed.

The liquid quaternizing agents which are applicable in my invention are those which are non-compatible with the polymeric materials hereinbefore described. As was hereinbefore said, a quaternizing agent is considered non-compatible if it causes a rubbery or resinous polymer to swell not more than 20 volume percent, or causes not more than 20 percent solvation of a liquid polymer, during the processing period under the conditions employed. The processing period includes the time required to produce a dispersion of the polymer in the quaternizing agent and such other steps as are required prior to the heating step. The processing period will vary from a few minutes, for example, 5 or 10 minutes, to 10 hours or more.

Compatibility of the quaternizing agent will depend, at least to some degree, upon the monomer system being employed. For example, a quaternizing agent incompatible with a copolymer of methylvinylpyridine with butadiene may be compatible where the comonomer is for example, vinyl acetate. The compounds set forth in this disclosure are regarded as applicable when operating with the polymers set forth in the hereinbelow examples.

The quaternizing agents which are applicable in the practice of my invention may contain up to 100 carbon atoms and are of the following types:

(1) Halides of alkylene glycol monoethers $$R—(OC_nH_{2n})_mX$$

where R represents an alkyl, cycloalkyl, aryl, alkaryl, or aralkyl group containing from 1 to 20 carbon atoms, $n$ is an integer from 2 to 20, $m$ is an integer from 1 to 20, and X represents chlorine, bromine, or iodine. Examples of compounds of this type are: methoxypolyethylene glycol bromide, ethoxypolyethylene glycol chloride, eicosoxytriethylene glycol bromide, dodecoxydiethylene glycol iodide, butoxytetraethylene glycol bromide, hexadecoxypropylene glycol bromide, decoxytetradeca(propylene) glycol chloride, eicosoxyethylene glycol iodide, eicosoxytetra(eicosamethylene) glycol bromide, hexadecoxypropylene glycol chloride, decoxytetradeca(propylene) glycol bromide, phenoxytriethylene glycol bromide, 2,4-diethylphenoxy-di(pentamethylene) glycol iodide, 4-tert-tetradecylphenoxypentapropylene glycol chloride, phenylmethoxydiethylene glycol bromide, cyclohexoxytetraethylene glycol bromide, cyclopentoxypentapropylene chloride, and like halides of polyalkylene glycol monoethers.

(2) Halogen-substituted esters of saturated and unsaturated monobasic aliphatic acids

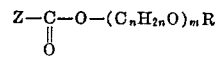

where Z represents a halogen-substituted alkyl or alkenyl radical, straight or branched chain, containing from 1 to 19 carbon atoms and 1–3 halogen atoms, with the halogen being chlorine, bromine, or iodine and occupying any position in the carbon chain but at least one halogen atom preferably being on the carbon atom alpha to the carbonyl group or to a double bond, if present, R represents an alkyl, cycloalkyl, aryl, alkaryl, or aralkyl group containing from 1 to 20 carbon atoms, $n$ is an integer from 2 to 20, and $m$ is an integer from 0 to 20. Examples of compounds of this type are: methoxytriethylene glycol ester of chloroacetic acid, methoxyethylene glycol ester of trichloroacetic acid, ethoxydipropylene glycol ester of alpha-chloropropionic acid, eicosoxytri-(eicosamethylene) glycol ester of alpha-bromoarachidic acid, phenoxydiethylene glycol ester of alpha-chlorobutyric acid, phenylmethoxypentamethylene glycol ester of alpha-iodocapric acid, methoxypolyethylene glycol ester of alpha-chloropropionic acid, cyclohexoxytetraethylene glycol ester of alpha-chloropropionic acid, lauryl alcohol ester of trichloroacetic acid, cetyl alcohol ester of alpha-bromoarachidic acid, benzyl alcohol ester of beta-bromopropionic acid, 4-tert-dodecylbenzyl alcohol ester of trichloroacetic acid, and other similar compounds having the formulas

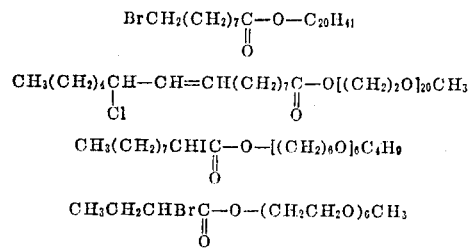

(3) Halogen-substituted esters of saturated and unsaturated dibasic aliphatic acids

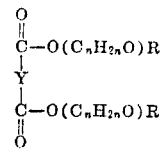

where Y represents a halogen-substituted alkylene or alkenylene radical, straight or branched chain, containing from 1 to 18 carbon atoms and 1 to 2 halogen atoms, with the halogen being chlorine, bromine or iodine and occupying any position in the carbon chain, but at least one halogen preferably being on the carbon atom alpha to the carbonyl group or to a double bond, if present, R represents an alkyl, cycloalkyl, aryl, alkaryl, or aralkyl group containing from 1 to 20 carbon atoms, $n$ is an integer from 2 to 20, and $m$ is an integer from 0 to 20. Examples of compounds of this type are: dioctyl ester of alpha-chlorosebacic acid, dioctyl ester of bromomalonic acid, dioctadecyl ester of dichloromalonic acid, dieicosyl ester of chlorosuccinic acid, di-tert-butyl ester of alpha-iodoazelaic acid, didodecyl ester of alpha, alpha'-dichloropimelic acid, di[methoxydipropylene glycol] ester of alpha, alpha'-dichloroadipic acid, di[eiscosoxytri-(eicosamethylene) glycol] ester of alpha-iodosebacic acid, diphenoxydiethylene glycol ester of diiodomalonic acid, di[phenylmethoxytetramethylene glycol] ester of alpha, alpha'-dibromoglutaric acid, di[butoxydiethylene glycol] ester of chloromaleic acid (dibutyl carbitol chloromaleate), di[cyclohexoxyethylene glycol] ester of alpha-chlorosebacic acid, and other similar compounds having the formulas

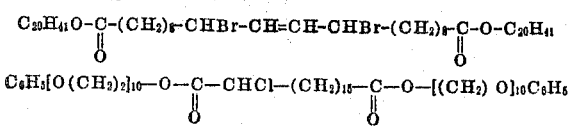

(4) Halogen-substituted diesters of dihydric alcohols

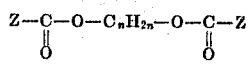

where Z represents a halogen-substituted alkyl or alkenyl radical, straight or branched chain, containing from 1 to 19 carbon atoms and 1–3 halogen atoms, with the halogen being chlorine, bromine or iodine and occupying any position in the carbon chain but at least one halogen atom preferably being on the carbon atom alpha to the carbonyl group or to a double bond, if present, and $n$ is an integer from 2 to 20. Examples of compounds of this type are: di(alpha-chloroacetic acid) ester of ethylene glycol, di-(alpha-bromopropionic acid) ester of trimethylene glycol, di(alpha-iodoacetic acid) ester of dodecaethylene glycol, di(alpha-chloroisobutyric acid) ester of pentamethylene glycol, di(alpha-bromoarachidic acid) ester of eicosamethylene glycol, and other similar compounds having the formulas

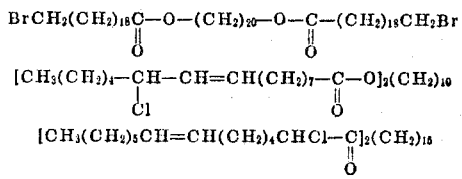

(5) Halogen-containing phosphonic acid esters (halophosphonates)

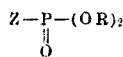

where Z represents a halogen-substituted alkyl or alkenyl radical, straight or branched chain, containing from 1 to 19 carbon atoms and 1–3 halogen atoms, with the halogen being chlorine, bromine or iodine and occupying any position in the carbon chain but at least one halogen atom preferably being on the carbon atom alpha to the phosphonyl group or to a double bond, if present, R represents an alkyl, cycloalkyl, aryl, alkaryl, or aralkyl group containing from 1 to 20 carbon atoms, or alkoxy, cycloalkoxy, aryloxy, alkaryloxy, or aralkoxy substituted derivatives of the foregoing. Examples of compounds of this type are: bis-(2-methoxyethyl)2-bromoethyl phosphonate, bis-(1-methoxyethyl)1-bromoethyl phosphonate, bis-(2-ethoxyethyl)2-chloroethyl phosphonate, bis-(2-decoxyethyl)2-iodoethyl phosphonate, bis-(1-dodecoxyethyl)1-chloroethyl phosphonate, dioctyl-4-iodobutyl phosphonate, dilauryl - 2 - bromopropyl phosphonate, dicyclohexyl - 3 - chloropropyl phosphonate, bis-(2-cyclohexoxy)2-bromoethyl phosphonate, and other similar compounds having the formulas

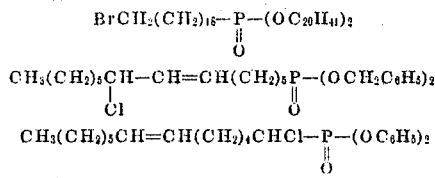

While the formulas of the foregoing compounds have been presented by way of example as materials which are operable in the practice of this invention, it is to be understood that similar compounds containing a larger number of halogen atoms per molecule, i. e., those containing up to ten or more halogen atoms in some instances, are within the scope of the invention.

The amount of quaternizing agent employed is generally that which is sufficient to effect substantially complete conversion of the pyridine and/or quinoline units of the copolymer to the corresponding pyridinium or quinolinium units. Physical properties in the solid polymeric material can be varied by using more or less than the stoichiometric amount of the quaternizing agent. For example only about 20 to 50 percent of the stoichiometric amount may be desired in some instances, while in other cases as much as 50 percent excess is considered advantageous. In those cases where an excess of the quaternizing agent is added, the unreacted material should be compatible with the quaternized polymer. This unreacted material then serves as a plasticizer for the quaternized polymer. Operating in the manner described employing variable amounts of quaternizing agent affords a method of obtaining solid polymeric products having widely varying properties depending upon the polymer and the quaternizing agent employed as well as upon the amount of the quaternizing agent.

To further illustrate my invention the following specific examples are given, these are to be taken as illustrative only and not as limiting in any sense.

*Example I*

Poly-2-methyl-5-vinylpyridine was prepared by emulsion polymerization at 50° C. in accordance with the following recipe:

| | Parts by weight |
|---|---|
| 2-methyl-5-vinylpyridine | 100 |
| Water | 180 |
| Sodium fatty acid soap | 5 |
| Potassium persulfate | 0.3 |
| Mercaptan blend [1] | 0.3 |

[1] A blend of tertiary $C_{12}$, $C_{14}$ and $C_{16}$ aliphatic mercaptans in a ratio of 3 : 1 : 1 parts by weight.

The poly-2-methyl-5-vinylpyridine was ground to 60 mesh size and 1.2 grams of this material was dispersed in 5.9 grams of methoxypolyethylene glycol bromide by hand stirring. The bromide of methoxypolyethylene glycol was prepared from methoxypolyethylene glycol 550, a product of Carbide and Carbon Chemicals Company. It is a completely water-soluble product having an average molecular weight of 525–575, a specific gravity 55/20 of 1.07, and a freezing range of 15–25° C.

A fluid mixture was obtained which was converted to a solid product by heating it for 6 hours at 80° C.

*Example II*

A 50/50 butadiene/2-methyl-5-vinylpyridine copolymer was prepared by emulsion polymerization at 50° C. using the recipe given in Example I. The polymer was ground to 60 mesh size and 1.2 grams dispersed in a chemically equivalent quantity (2.95 grams) of methoxypolyethylene glycol bromide. A fluid mixture was obtained which was heated for 6 hours at 80° C. and a solid rubbery product was formed. The methoxypolyethylene glycol bromide as used in this example is the same material as was used in Example I.

*Example III*

A fluid dispersion containing 300 parts by weight of a 90/10 2-methyl-5-vinylpyridine/styrene resin (100 mesh) in 100 parts by weight of glycol bis-(chloroacetate) was prepared by stirring the mixture at 100° F. The temperature was then raised to 140° F. and a solid resin was obtained at 15 minutes.

A dispersion was prepared as described above except that 50 parts by weight, based on the 2-methyl-5-vinylpyridine/styrene resin, of amylbiphenyl was added as a plasticizer. The dispersion was fluid at 80° F. but when the temperature was raised to 140° F., the mixture cured to a flexible resin in 15 minutes.

It will be apparent to those skilled in the art that many variations, improvements and substituents can be made in light of this disclosure without departing from the spirit or scope of my invention or disclosure.

I claim:
1. A process for the production of quaternized polymeric compounds from polymers selected from the group consisting of liquid and solid polymers of pyridines and quinolines having at least one substituent of the type

and alkyl substituents thereof wherein R is selected from the group consisting of H— and CH₃— and wherein the total carbon atoms in nuclear substituents does not exceed 12, said process comprising the steps of dispersing the polymer solely in a liquid quaternizing agent at a temperature whereat said polymer when liquid is solvated not greater than 20 percent and when solid is swollen not more than 20 percent thereby forming a non-homogeneous dispersion, heating the resulting dispersion until said dispersion becomes homogeneous and quaternization is effected resulting in solid polymeric product.

2. The process for the production of rubbery polymeric compounds from copolymers of a conjugated diene of 4 to 8 carbon atoms and a monomer selected from the group consisting of pyridines and quinolines having at least one

substituent wherein R is selected from the group consisting of H— and CH₃— and alkyl substituents thereof and wherein the total carbon atoms in such substituents does not exceed 12, said process comprising the steps of dispersing the polymer solely in a liquid quaternizing agent at a temperature whereat said polymer is swollen not more than 20 percent thereby forming a non-homogeneous dispersion, heating the resulting dispersion until the dispersion becomes homogeneous and quaternization is effected resulting in a rubbery polymeric material.

3. A process for the production of solid polymeric compounds from polymers selected from the group consisting of polymers of pyridines and polymers of quinolines having at least one

substituent and alkyl substituents thereof wherein R is selected from the group consisting of H— and CH₃— and wherein the total carbon atoms in nuclear substituents does not exceed 12, said process comprising the steps of dispersing the polymer in a liquid quaternizing agent at a temperature wherein said polymer is swollen not more than 20 percent to form a heterogeneous dispersion, casting the dispersed material into a mold, heating the dispersion in said molds until homogeneous and thereby effecting quaternization resulting in polymer product of the mold shape.

4. A process for the production of coatings for solid objects from polymers selected from the group consisting of pyridines and quinolines having at least one

substituent and alkyl substituents thereof wherein R is selected from the group consisting of H— and CH₃— and wherein the total carbon atoms in nuclear substituents does not exceed 12, said process comprising the steps of dispersing the polymer in a liquid quaternizing agent at a temperature whereat said polymer is swollen not more than 20 percent thereby forming a heterogeneous dispersion, dipping a solid object in said dispersion, withdrawing said solid object whereby a film of the dispersed material remains on the solid object, and heating said object containing the liquid film, whereby the dispersion becomes homogeneous and quaternization is effected resulting in the solid object being coated by solid quaternized polymeric material.

5. The process of claim 1 wherein the polymeric material is 2-methyl-5-vinylpyridine and the non-compatible quaternizing agent is methoxypolyethylene glycol bromide.

6. The process of claim 1 wherein the polymeric material is 2-methyl-5-vinylpyridine and the non-compatible quaternizing agent is methoxypolyethylene glycol ester of alpha-chloropropionic acid.

7. The process of claim 1 wherein the polymeric material is 2-methyl-5-vinylpyridine and the non-compatible quaternizing agent is dioctyl ester of alpha-chlorosebacic acid.

8. The process of claim 1 wherein the polymeric material is 2-methyl-5-vinylpyridine and the non-compatible quaternizing agent is di(alpha-chloroacetic acid) ester of trimethylene glycol.

9. The process of claim 1 wherein the polymeric material is 2-methyl-5-vinylpyridine and the non-compatible quaternizing agent is bis-(2-methoxyethyl) 2-bromoethyl phosphoate.

10. The process of claim 2 wherein the polymeric material is a 50/50 copolymer of butadiene and 2-methyl-5-vinylpyridine and the non-compatible quaternizing agent is methoxypolyethylene glycol bromide.

11. The process of claim 2 wherein the polymeric material is a 50/50 copolymer of butadiene and 2-methyl-5-vinylpyridine and the non-compatible quaternizing agent is methoxypolyethylene glycol ester of alpha-chloropropionic acid.

12. The process of claim 2 wherein the polymeric material is a 50/50 copolymer of butadiene and 2-methyl-5-vinylpyridine and the non-compatible quaternizing agent is dioctyl ester of alpha-chlorosebacic acid.

13. The process of claim 2 wherein the polymeric material is a 50/50 copolymer of butadiene and 2-methyl-5-vinylpyridine and the non-compatible quaternizing agent is di(alpha-chloroacetic acid) ester of trimethylene glycol.

14. The process of claim 2 wherein the polymeric material is a 50/50 copolymer of butadiene and 2-methyl-5-vinylpyridine and the non-compatible quaternizing agent is bis-(2-methoxyethyl) 2-bromoethyl phosphonate.

15. A process for the production of solid polymeric compounds from polymers selected from the group consisting of polymers of pyridines and quinolines having at least one

substituent and alkyl substituents thereof wherein R is selected from the group consisting of H— and CH₃— and wherein the total carbon atoms in such substituents do not exceed 12, said process comprising the steps of dispersing the polymer solely in a liquid non-compatible quaternizing agent wherein said polymer is not swollen more than 20 percent thereby forming a heterogeneous dispersion and heating said dispersion until a homogeneous blend is obtained and quaternization is effected, said non-compatible quaternizing agent comprising a halide of an alkylene glycol monoether of the general formula R—[OC$_n$H$_{2n}$]$_m$X wherein X is selected from the group consisting of chlorine, bromine, and iodine; R is selected from the group consisting of alkyl, cycloalkyl, aryl, alkaryl, and aralkyl radicals containing 1 to 20 carbon atoms; $n$ is an integer from 2 to 20 and $m$ is an integer from 1 to 20.

16. A process for the production of solid polymeric compounds from polymers selected from the group consisting of polymers of pyridines and quinolines having at least one

substituent and alkyl substituents thereof wherein R is selected from the group consisting of H— and CH₃— and wherein the total carbon atoms in such substituents do not exceed 12, said process comprising the steps of dispersing the polymer solely in a liquid non-compatible quaternizing agent wherein said polymer is not swollen more than 20 percent thereby forming a heterogeneous dispersion and heating said dispersion until a homogeneous blend is obtained and quaternization is effected, said non-compatible quaternizing agent being selected from the group consisting of halogen-substituted esters of saturated and unsaturated monobasic aliphatic acids of the general formula $$Z-\underset{\underset{O}{\|}}{C}-O-[C_nH_{2n}O]_mR$$

wherein Z is selected from the group consisting of chlorine, bromine, and iodine-substituted alkyl and alkenyl radicals containing 1 to 19 carbon atoms and 1 to 3 halogen atoms, R is selected from the group consisting of alkyl, cycloalkyl, aryl, alkaryl, and aralkyl radicals containing 1 to 20 carbon atoms; $n$ is an integer from 2 to 20 and $m$ is an integer from 0 to 20.

17. A process for the production of solid polymeric compounds from polymers selected from the group consisting of polymers of pyridines and quinolines having at least one $$CH_2=\underset{\underset{}{|}}{\overset{R}{C}}-$$

substituent and alkyl substituents thereof wherein R is selected from the group consisting of H— and CH₃— and wherein the total carbon atoms in such substituents do not exceed 12, said process comprising the steps of dispersing the polymer solely in a liquid non-compatible quaternizing agent wherein said polymer is not swollen more than 20 percent thereby forming a heterogeneous dispersion and heating said dispersion until a homogeneous blend is obtained and quaternization is effected, said non-compatible quaternizing agent comprising a halogen-substituted ester of a dibasic aliphatic acid of the general formula $$\begin{array}{c}O\\\|\\C-O(C_nH_{2n}O)R\\|\\Y\\|\\C-O(C_nH_{2n}O)R\\\|\\O\end{array}$$

wherein Y is selected from the group consisting of chlorine, bromine and iodine substituted alkylene and alkenylene radicals containing 1 to 18 carbon atoms and 1 to 2 halogen atoms; R is selected from the group consisting of alkyl, cycloalkyl, aryl, alkaryl, and aralkyl radicals containing from 1 to 20 carbon atoms; $n$ is an integer from 2 to 20; $m$ is an integer from 0 to 20.

18. A process for the production of solid polymeric compounds from polymers selected from the group consisting of polymers of pyridines and quinolines having at least one $$CH_2=\underset{\underset{}{|}}{\overset{R}{C}}-$$

substituent and alkyl substituents thereof wherein R is selected from the group consisting of H— and CH₃— and wherein the total carbon atoms in such substituents do not exceed 12, said process comprising the steps of dispersing the polymer solely in a liquid non-compatible quaternizing agent wherein said polymer is not swollen more than 20 percent thereby forming a heterogeneous dispersion and heating said dispersion until a homogeneous blend is obtained and quaternization is effected, said non-compatible quaternizing agent comprising a halogen-containing phosphonic acid ester such as $$Z-\underset{\underset{O}{\|}}{P}-(OR)_2$$

wherein Z is selected from the group consisting of chlorine, bromine and iodine-substituted alkyl and alkenyl radicals containing 1 to 19 carbon atoms and 1 to 3 halogen atoms; and R is selected from the group consisting of alkyl, cycloalkyl, aryl, alkaryl, and aralkyl radicals containing 1 to 20 carbon atoms.

19. A process for the production of solid polymeric compounds from polymers selected from the group consisting of polymers of pyridines and quinolines having at least one $$CH_2=\underset{\underset{}{|}}{\overset{R}{C}}-$$

substituent and alkyl substituents thereof wherein R is selected from the group consisting of H— and CH₃— and wherein the total carbon atoms in such substituents do not exceed 12, said process comprising the steps of dispersing the polymer solely in a liquid non-compatible quaternizing agent wherein said polymer is not swollen more than 20 percent thereby forming a heterogeneous dispersion and heating said dispersion until a homogeneous blend is obtained and quaternization is effected, said non-compatible quaternizing agent comprising a halogen-substituted diester of a dihydric alcohol of the general formula $$Z-\underset{\underset{O}{\|}}{C}-O-C_nH_{2n}-O-\underset{\underset{O}{\|}}{C}-Z$$

wherein Z is selected from the group consisting of chlorine, bromine and iodine-substituted alkyl and alkenyl radicals containing from 1 to 19 carbon atoms and 1 to 3 halogen atoms; and $n$ is an integer from 2 to 20.

References Cited in the file of this patent

UNITED STATES PATENTS

| | | |
|---|---|---|
| 2,484,420 | Minsk et al. | Oct. 11, 1949 |
| 2,484,430 | Sprague et al. | Oct. 11, 1949 |
| 2,487,829 | Richards | Nov. 15, 1949 |
| 2,540,985 | Jackson | Feb. 6, 1951 |
| 2,631,993 | Morgan | Mar. 17, 1953 |

OTHER REFERENCES

Flint: Chem. and Tech. of Rubber Latex (Van Nostrand 1938), pages 349–52, 566–67.